(12) United States Patent
Sun et al.

(10) Patent No.: US 12,501,463 B2
(45) Date of Patent: *Dec. 16, 2025

(54) CONTROL RESOURCE SET FOR NEW RADIO

(71) Applicant: QUALCOMM Incorporated, San Diego, CA (US)

(72) Inventors: Jing Sun, San Diego, CA (US); Xiaoxia Zhang, San Diego, CA (US); Stefan Brueck, Neunkirchen am Brand (DE); Christian Sgraja, Ehingen (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/765,539

(22) Filed: Jul. 8, 2024

(65) Prior Publication Data

US 2024/0365359 A1 Oct. 31, 2024

Related U.S. Application Data

(63) Continuation of application No. 17/248,124, filed on Jan. 11, 2021, now Pat. No. 12,058,709.

(Continued)

(51) Int. Cl.
*H04W 72/53* (2023.01)
*H04W 24/08* (2009.01)
(Continued)

(52) U.S. Cl.
CPC .......... *H04W 72/53* (2023.01); *H04W 24/08* (2013.01); *H04W 72/0453* (2013.01); *H04W 72/23* (2023.01)

(58) Field of Classification Search
None
See application file for complete search history.

(56) References Cited

U.S. PATENT DOCUMENTS

| 11,622,322 B1 * | 4/2023 | Weisbrod | H04W 48/16 |
| | | | 370/329 |
| 12,058,709 B2 * | 8/2024 | Sun | H04W 72/53 |

(Continued)

FOREIGN PATENT DOCUMENTS

| WO | 2019160713 A1 | 8/2019 |
| WO | 2019192018 A1 | 10/2019 |

OTHER PUBLICATIONS

International Preliminary Report On Patentability—PCT/US2021/070019—The International Bureau of WIPO—Geneva, Switzerland—Aug. 25, 2022.

(Continued)

*Primary Examiner* — Christopher T Wyllie
(74) *Attorney, Agent, or Firm* — Harrity & Harrity, LLP

(57) ABSTRACT

Various aspects of the present disclosure generally relate to wireless communication. In some aspects, a user equipment (UE) may receive configurations for a plurality of search space sets for a control resource set (CORESET), the plurality of search space sets including one or more of a first type of search space set configured with multiple frequency domain monitoring locations or a second type of search space set configured without multiple frequency domain monitoring locations. The UE may receive a physical downlink control channel communication based at least in part on monitoring the plurality of search space sets according to a determination that the CORESET is associated with search space sets of a same type. Numerous other aspects are described.

20 Claims, 9 Drawing Sheets

Related U.S. Application Data

(60) Provisional application No. 62/975,466, filed on Feb. 12, 2020.

(51) Int. Cl.
*H04W 72/0453* (2023.01)
*H04W 72/23* (2023.01)

(56) References Cited

U.S. PATENT DOCUMENTS

| | | | |
|---|---|---|---|
| 2013/0322562 A1* | 12/2013 | Zhang | H04B 7/0808 375/267 |
| 2018/0107880 A1* | 4/2018 | Danielsson | G08B 13/194 |
| 2019/0159180 A1* | 5/2019 | Ly | H04W 72/23 |
| 2019/0313383 A1 | 10/2019 | Xiong et al. | |
| 2021/0022181 A1* | 1/2021 | Kwak | H04W 72/0453 |
| 2021/0058970 A1* | 2/2021 | Kwak | H04W 72/23 |
| 2021/0105812 A1* | 4/2021 | Rastegardoost | H04L 1/1671 |
| 2021/0143943 A1* | 5/2021 | Zhou | H04W 72/0453 |
| 2021/0250953 A1* | 8/2021 | Sun | H04W 48/12 |
| 2022/0078781 A1* | 3/2022 | Zhou | H04W 16/14 |
| 2022/0240284 A1* | 7/2022 | Zhou | H04L 5/0096 |
| 2022/0361022 A1* | 11/2022 | Cheng | H04W 72/23 |
| 2022/0368489 A1* | 11/2022 | Grant | H04L 5/001 |
| 2024/0365359 A1* | 10/2024 | Sun | H04W 72/0453 |
| 2025/0220472 A1* | 7/2025 | Cheng | H04W 72/23 |

OTHER PUBLICATIONS

International Search Report and Written Opinion—PCT/US2021/070019—ISA/EPO—Apr. 30, 2021.

LG Electronics: "Summary #2 on Wide-Band Operation for NR-U", 3GPP Draft, 3GPP TSG RAN WG1 #99, R1-1913543, 3rd Generation Partnership Project (3GPP), Mobile Competence Centre, 650, Route Des Lucioles, F-06921 Sophia-Antipolis Cedex, France, vol. RAN WG1. No. Reno, USA, Nov. 18, 2019-Nov. 22, 2019, Nov. 25, 2019 (Nov. 25, 2019), XP051830824, 23 Pages, figure 1 section 4.1; p. 7-p. 15.

LG Electronics: "Summary on Wide-Band Operation for NR-U", 3GPP Draft, 3GPP TSG RAN WG1 #99, R1-1912394, 3rd Generation Partnership Project (3GPP), Mobile Competence Centre, 650, Route Des Lucioles, F-06921 Sophia-Antipolis Cedex, France, vol. RAN WG1. No. Reno. USA, Nov. 18, 2019-Nov. 22, 2019, Nov. 25, 2019 (Nov. 25, 2019), XP051830569, 22 Pages, section 3.1; p. 6-p. 14.

* cited by examiner

CONTROL RESOURCE SET FOR NEW RADIO

CROSS-REFERENCE TO RELATED APPLICATION

This application is a continuation of U.S. patent application Ser. No. 17/248,124, filed on Jan. 11, 2021, entitled "CONTROL RESOURCE SET FOR NEW RADIO," which claims priority to U.S. Provisional Patent Application No. 62/975,466, filed on Feb. 12, 2020, entitled "CONTROL RESOURCE SET FOR NEW RADIO IN UNLICENSED SPECTRUM," the contents of which are incorporated herein by reference in their entireties.

FIELD OF THE DISCLOSURE

Aspects of the present disclosure generally relate to wireless communication and to techniques and apparatuses for a control resource set for New Radio in unlicensed spectrum (NR-U).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving configurations for a plurality of search space sets for a control resource set (CORESET), the plurality of search space sets including one or more of a first type of search space set configured with multiple frequency domain monitoring locations or a second type of search space set configured without multiple frequency domain monitoring locations; and receiving a physical downlink control channel (PDCCH) communication based at least in part on monitoring the plurality of search space sets according to a determination that the CORESET is associated with search space sets of a same type.

In some aspects, a method of wireless communication, performed by a base station (BS), may include transmitting configurations for a plurality of search space sets for a CORESET, the plurality of search space sets including one or more of a first type of search space set configured with multiple frequency domain monitoring locations or a second type of search space set configured without multiple frequency domain monitoring locations; and transmitting a PDCCH communication in the CORESET based at least in part on the CORESET being associated with search space sets of a same type.

In some aspects, a method of wireless communication, performed by a UE, may include monitoring a CORESET, having frequency domain resources that are in multiple resource block sets, for a PDCCH communication; and selectively receiving the PDCCH communication in the CORESET based at least in part on whether respective listen-before-talk (LBT) operations for the multiple resource block sets are successful.

In some aspects, a method of wireless communication, performed by a BS, may include performing respective LBT operations for multiple resource block sets that include frequency domain resources of a CORESET; and selectively transmitting a PDCCH communication in the CORESET based at least in part on whether the respective LBT operations for the multiple resource block sets are successful.

In some aspects, a UE for wireless communication may include a memory and one or more processors operatively coupled to the memory. The memory and the one or more processors may be configured to receive configurations for a plurality of search space sets for a CORESET, the plurality of search space sets including one or more of a first type of search space set configured with multiple frequency domain monitoring locations or a second type of search space set configured without multiple frequency domain monitoring locations; and receive a PDCCH communication based at least in part on monitoring the plurality of search space sets according to a determination that the CORESET is associated with search space sets of a same type.

In some aspects, a BS for wireless communication may include a memory and one or more processors operatively coupled to the memory. The memory and the one or more processors may be configured to transmit configurations for a plurality of search space sets for a CORESET, the plurality of search space sets including one or more of a first type of search space set configured with multiple frequency domain monitoring locations or a second type of search space set configured without multiple frequency domain monitoring locations; and transmit a PDCCH communication in the CORESET based at least in part on the CORESET being associated with search space sets of a same type.

In some aspects, a UE for wireless communication may include a memory and one or more processors operatively coupled to the memory. The memory and the one or more processors may be configured to monitor a CORESET, having frequency domain resources that are in multiple resource block sets, for a PDCCH communication; and selectively receive the PDCCH communication in the CORESET based at least in part on whether respective LBT operations for the multiple resource block sets are successful.

In some aspects, a BS for wireless communication may include a memory and one or more processors operatively coupled to the memory. The memory and the one or more processors may be configured to perform respective LBT operations for multiple resource block sets that include frequency domain resources of a CORESET; and selectively transmit a PDCCH communication in the CORESET based at least in part on whether the respective LBT operations for the multiple resource block sets are successful.

In some aspects, a non-transitory computer-readable medium may store one or more instructions for wireless communication. The one or more instructions, when executed by one or more processors of a UE, may cause the one or more processors to receive configurations for a plurality of search space sets for a CORESET, the plurality of search space sets including one or more of a first type of search space set configured with multiple frequency domain monitoring locations or a second type of search space set configured without multiple frequency domain monitoring locations; and receive a PDCCH communication based at least in part on monitoring the plurality of search space sets according to a determination that the CORESET is associated with search space sets of a same type.

In some aspects, a non-transitory computer-readable medium may store one or more instructions for wireless communication. The one or more instructions, when executed by one or more processors of a BS, may cause the one or more processors to transmit configurations for a plurality of search space sets for a CORESET, the plurality of search space sets including one or more of a first type of search space set configured with multiple frequency domain monitoring locations or a second type of search space set configured without multiple frequency domain monitoring locations; and transmit a PDCCH communication in the CORESET based at least in part on the CORESET being associated with search space sets of a same type.

In some aspects, a non-transitory computer-readable medium may store one or more instructions for wireless communication. The one or more instructions, when executed by one or more processors of a UE, may cause the one or more processors to monitor a CORESET, having frequency domain resources that are in multiple resource block sets, for a PDCCH communication; and selectively receive the PDCCH communication in the CORESET based at least in part on whether respective LBT operations for the multiple resource block sets are successful.

In some aspects, a non-transitory computer-readable medium may store one or more instructions for wireless communication. The one or more instructions, when executed by one or more processors of a BS, may cause the one or more processors to perform respective LBT operations for multiple resource block sets that include frequency domain resources of a CORESET; and selectively transmit a PDCCH communication in the CORESET based at least in part on whether the respective LBT operations for the multiple resource block sets are successful.

In some aspects, an apparatus for wireless communication may include means for receiving configurations for a plurality of search space sets for a CORESET, the plurality of search space sets including one or more of a first type of search space set configured with multiple frequency domain monitoring locations or a second type of search space set configured without multiple frequency domain monitoring locations; and means for receiving a PDCCH communication based at least in part on monitoring the plurality of search space sets according to a determination that the CORESET is associated with search space sets of a same type.

In some aspects, an apparatus for wireless communication may include means for transmitting configurations for a plurality of search space sets for a CORESET, the plurality of search space sets including one or more of a first type of search space set configured with multiple frequency domain monitoring locations or a second type of search space set configured without multiple frequency domain monitoring locations; and means for transmitting a PDCCH communication in the CORESET based at least in part on the CORESET being associated with search space sets of a same type.

In some aspects, an apparatus for wireless communication may include means for monitoring a CORESET, having frequency domain resources that are in multiple resource block sets, for a PDCCH communication; and means for selectively receiving the PDCCH communication in the CORESET based at least in part on whether respective LBT operations for the multiple resource block sets are successful.

In some aspects, an apparatus for wireless communication may include means for performing respective LBT operations for multiple resource block sets that include frequency domain resources of a CORESET; and means for selectively transmitting a PDCCH communication in the CORESET based at least in part on whether the respective LBT operations for the multiple resource block sets are successful.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
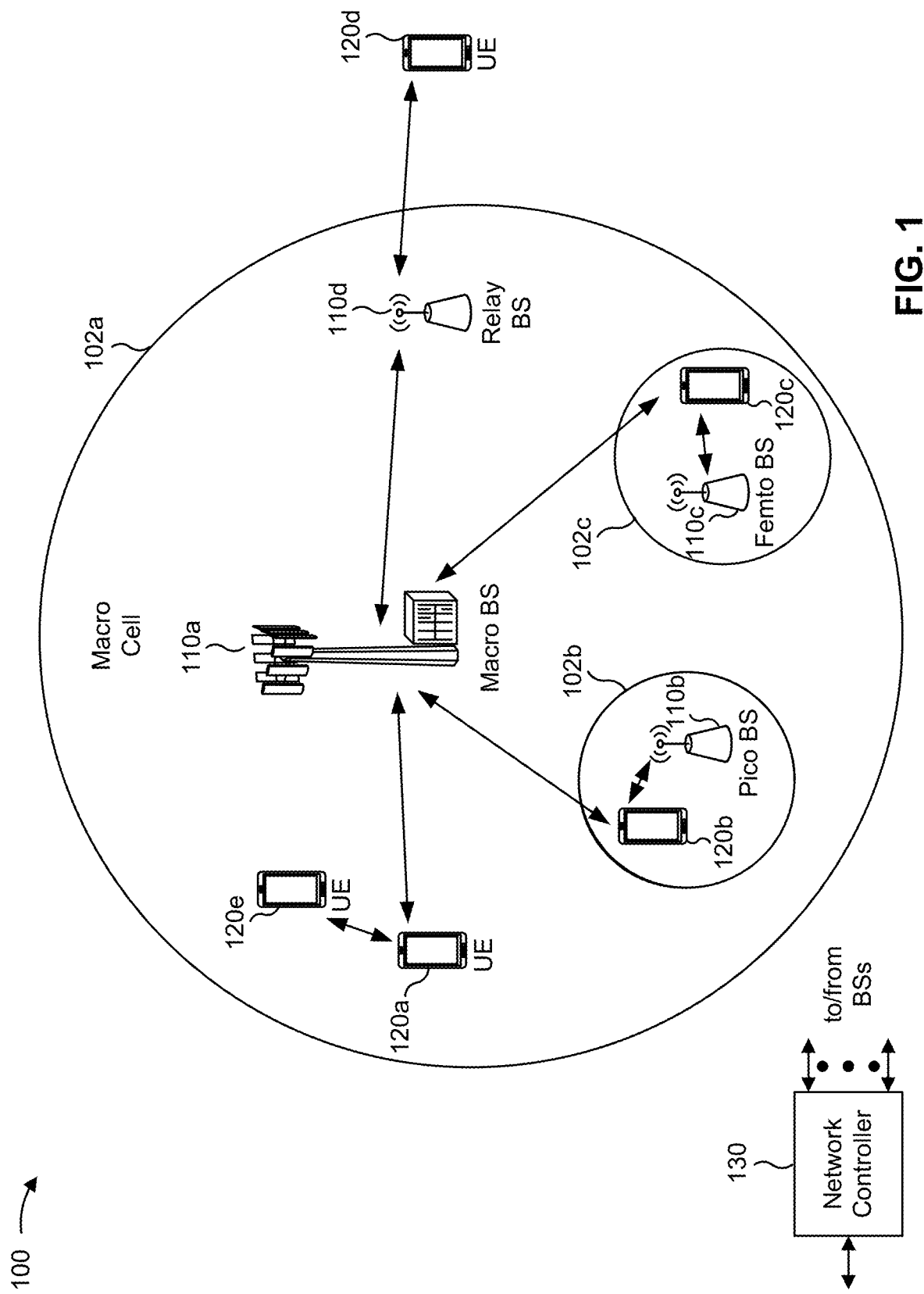
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
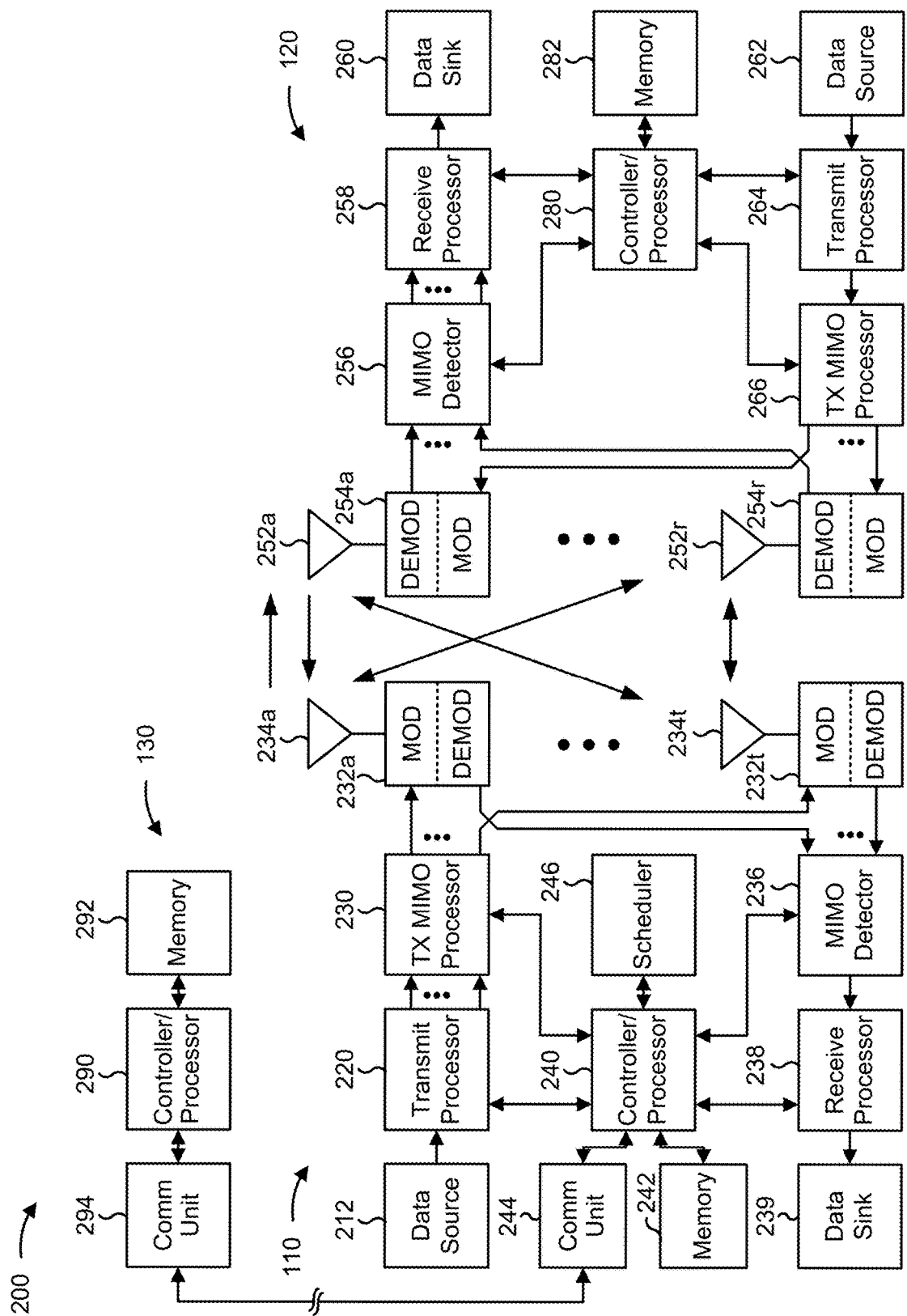
FIG. 2 is a block diagram illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a control resource set (CORESET) for NR (e.g., in unlicensed spectrum (NR-U)), as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 600 of FIG. 6, process 700 of FIG. 7, process 800 of FIG. 8, process 900 of FIG. 9, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving configurations for a plurality of search space sets for a CORESET, the plurality of search space sets including one or more of a first type of search space set configured with multiple frequency domain monitoring locations or a second type of search space set configured without multiple frequency domain monitoring locations, means for receiving a physical downlink control channel (PDCCH) communication based at least in part on monitoring the plurality of search space sets according to a determination that the CORESET is associated with search space sets of a same type, means for monitoring a CORESET, having frequency domain resources that are in multiple resource block sets, for a PDCCH communication, means for selectively receiving the PDCCH communication in the CORESET based at least in part on whether respective listen-before-talk (LBT) operations for the multiple resource block sets are successful, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting configurations for a plurality of search space sets for a CORESET, the plurality of search space sets including one or more of a first type of search space set configured with multiple frequency domain monitoring locations or a second type of search space set configured without multiple frequency domain monitoring locations, means for transmitting a PDCCH communication in the CORESET based at least in part on the CORESET being associated with search space sets of a same type, means for performing respective LBT operations for multiple resource block sets that include frequency domain resources of a CORESET, means for selectively transmitting a PDCCH communication in the CORESET based at least in part on whether the respective LBT operations for the multiple resource block sets are successful, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
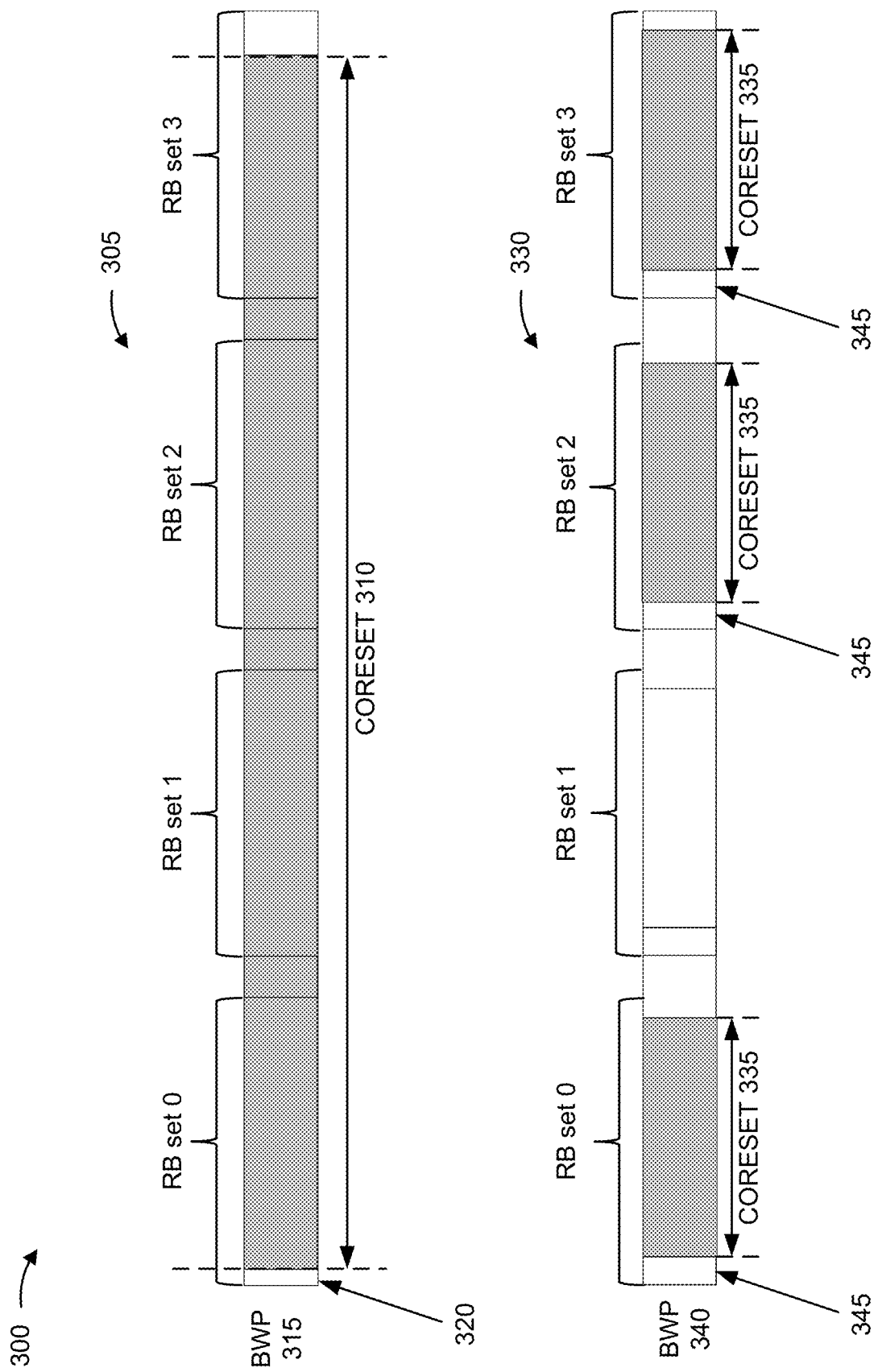
FIG. 3 is a diagram illustrating an example of control resource set (CORESET) structures.

FIG. 3 is a diagram illustrating an example 300 of CORESET structures, in accordance with various aspects of the present disclosure. As shown in FIG. 3, a CORESET structure 305 may include a CORESET 310 in a bandwidth part (BWP) 315. The CORESET 310 may include particular resource block (RB) groups that each include six RBs. The particular RB groups for the CORESET 310 may be identified by a frequency domain resources parameter (e.g., frequencyDomainResources) of a CORESET configuration. The frequency domain resources parameter may be a bitmap that maps RB groups to the CORESET 310 according to an RB grid that has a particular offset 320 from a lowest frequency of the BWP 315. As shown, the CORESET 310 may include RBs across multiple RB sets (shown as RB set 0, RB set 1, RB set 2, and RB set 3).

As shown in FIG. 3, a CORESET structure 330 may include a CORESET 335 in a BWP 340. In some aspects, the BWP 315 and the BWP 340 may be the same BWP or different BWPs. As shown, the CORESET 335 may include RBs of RB sets that are in particular bandwidths, such as LBT bandwidths (i.e., bandwidths in which an LBT operation is performed by a transmitter prior to transmitting) for NR-U. A CORESET configuration for the CORESET 335 may include a frequency domain resources parameter, as described above, and an RB offset parameter (e.g., rb-Offset).

In some cases, a search space configuration associated with the CORESET 335 may include a frequency domain monitoring locations parameter (e.g., freqMonitorLocations-r16). The frequency domain monitoring locations parameter may be a bitmap that identifies RB sets (e.g., one or more of RB set 0, RB set 1, RB set 2, or RB set 3) that are to be frequency domain monitoring locations for a search space. As shown, RB set 0, RB set 2, and RB set 3 may be frequency domain monitoring locations (e.g., the frequency domain monitoring locations bitmap has a value of 1011).

When frequency domain monitoring locations are configured in the search space configuration, the frequency domain resources parameter of the CORESET configuration may be interpreted differently than when frequency domain monitoring locations are not configured. For example, when frequency domain monitoring locations are configured, the frequency domain resources parameter of the CORESET configuration may be interpreted to identify, for the CORESET 335, only RB groups in a first RB set (e.g., RB set 0) that is identified as a frequency domain monitoring location. RB groups identified by the frequency domain resources parameter outside of the first RB set may be ignored. Moreover, the frequency domain resources parameter may be interpreted to map RB groups to the CORESET 335 according to an RB grid that has an offset 345 (according to the RB offset parameter of the CORESET configuration) from a lowest frequency of the first RB set. The CORESET 335 may include RBs in the other RB sets that are identified as frequency domain monitoring locations (e.g., RB set 2 and RB set 3) according to the RB offset parameter and following the pattern by which RB groups in the first RB set (e.g., RB set 0) are mapped to the CORESET 335.

In some wireless telecommunication systems, a CORESET may be configured with a plurality of search space sets (e.g., the CORESET may be associated with a plurality of search space sets configured for the CORESET). In this case, one or more of the search space sets may be configured with multiple frequency domain monitoring locations and one or more of the search space sets may be configured without multiple frequency domain monitoring locations. As described above, a frequency domain resources parameter for the CORESET may be interpreted differently based at least in part on whether a search space set is configured with multiple frequency domain monitoring locations. In particular, different offsets may be used based at least in part on whether a search space set is configured with multiple frequency domain monitoring locations, thereby defining different RB grids.

As a result, channel estimation that is performed for control channel elements (CCEs) that are defined according to one particular RB grid may not be applicable to CCEs that are defined according to another particular RB grid, thereby decreasing channel estimation efficiency. Moreover, defining CCEs according to multiple different RB grids may increase a complexity of CCE counting used for overbooking. Some techniques and apparatuses described herein enable search space sets configured for a CORESET to be of the same type, such that the search space sets use the same offset and thereby define the same RB grid.

In addition, in some wireless telecommunication systems, a CORESET may include frequency domain resources that are in multiple RB sets, as described above in connection with CORESET structure 305. That is, the CORESET may include frequency domain resources that are in multiple LBT bandwidths. In some cases, respective LBT operations for one or more RB sets may be successful, while respective LBT operations for one or more other RB sets may be unsuccessful. As a result, a PDCCH may be partially transmitted (e.g., in frequency domain resources of RB sets associated with successful LBT operations), thereby impairing performance of the PDCCH. In some techniques and apparatuses described herein, a PDCCH for a CORESET in multiple resource block sets is selectively transmitted based at least in part on whether respective LBT operations for the multiple resource block sets are successful, thereby improving performance of the PDCCH.

As indicated above, FIG. 3 is provided as an example. Other examples may differ from what is described with regard to FIG. 3.

Figure 4:
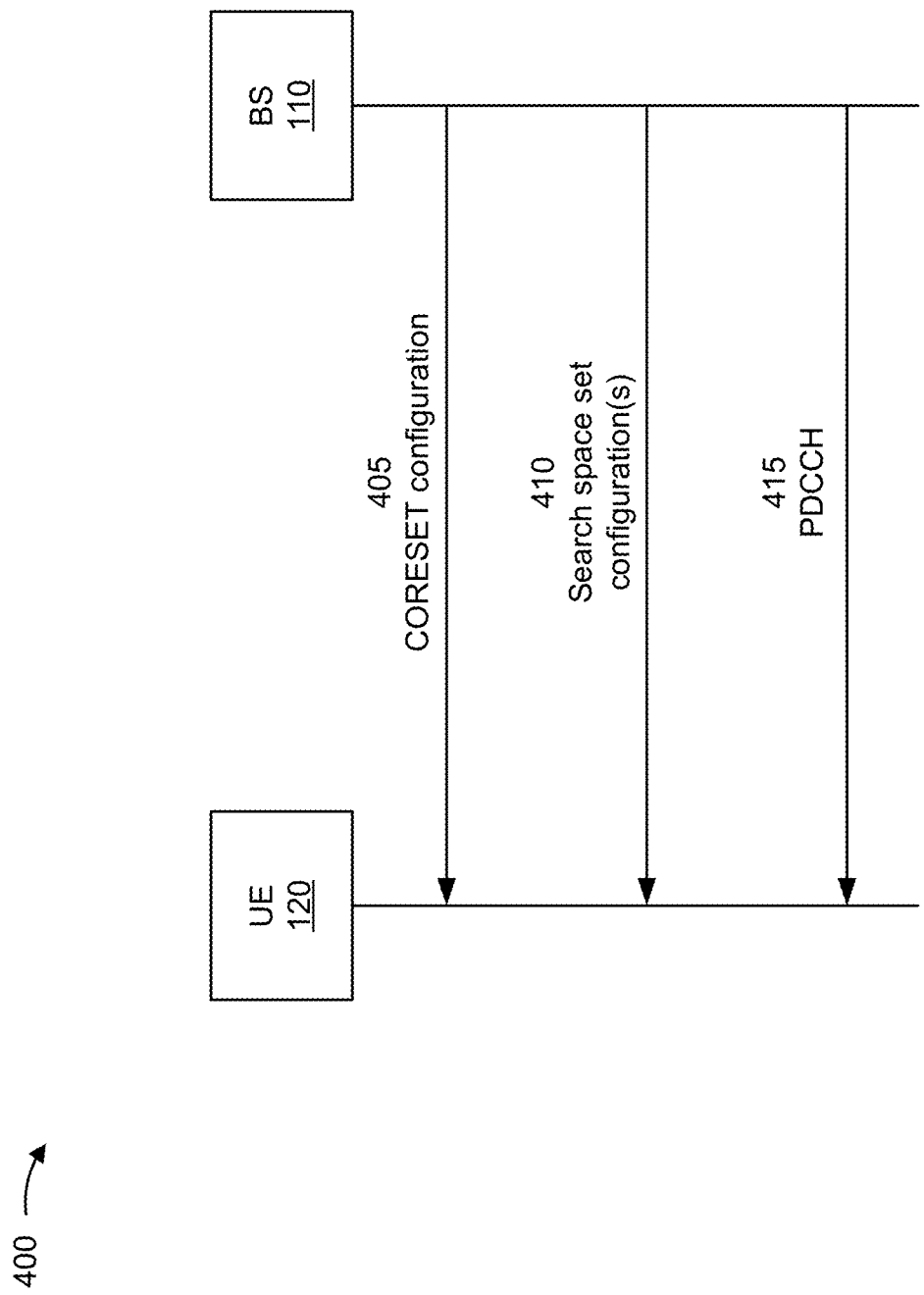
FIGS. 4-5 are diagrams illustrating examples of CORESETs for New Radio, in accordance with various aspects of the present disclosure.

FIG. 4 is a diagram illustrating an example 400 of a CORESET for NR-U, in accordance with various aspects of the present disclosure. As shown in FIG. 4, a UE 120 and a BS 110 may communicate in connection with a PDCCH communication. In some aspects, the UE 120 and the BS 110 may be operating in an unlicensed frequency spectrum. For example, the UE 120 and the BS 110 may be operating in NR-U.

As shown by reference number 405, the BS 110 may transmit, and the UE 120 may receive, a CORESET configuration (e.g., via radio resource control (RRC) signaling). The CORESET configuration may identify resources (e.g., RBs) that are included in a CORESET for the UE 120.

As shown by reference number 410, the BS 110 may transmit, and the UE 120 may receive, one or more search space set configurations (e.g., via RRC signaling). That is, the BS 110 may configure one or more search space sets for the CORESET (e.g., the CORESET may be associated with the one or more search space sets). In some aspects, the search space sets for the CORESET may be of the same type. A first type of search space set may be configured with multiple frequency domain monitoring locations (e.g., a configuration for the search space set may include a frequency domain monitoring locations parameter (freqMonitorLocations-r16)). A second type of search space set may be configured without multiple frequency domain monitoring locations (e.g., a configuration for the search space set may not include a frequency domain monitoring locations parameter (freqMonitorLocations-r16)).

Accordingly, all of the search space sets may be configured with multiple frequency domain monitoring locations, or all of the search space sets may be configured without multiple frequency domain monitoring locations. Moreover, all of the search space sets may be on the same RB grid, due to being the same type. In this way, the UE 120 may determine, for example when the CORESET configuration is received, that the search space sets configured for the CORESET will be of the same type and include CCEs according to the same RB grid.

As shown by reference number 415, the BS 110 may transmit to the UE one or more PDCCHs on one or more PDCCH candidates of the search space sets, and the UE 120 may monitor the search space sets for the one or more PDCCHs. For example, the UE 120 may perform channel estimation for CCEs of the CORESET when monitoring the search space sets. Due to the search space sets being of the same type, the UE 120 may perform the channel estimation with improved efficiency.

As indicated above, FIG. 4 is provided as an example. Other examples may differ from what is described with regard to FIG. 4.

Figure 5:
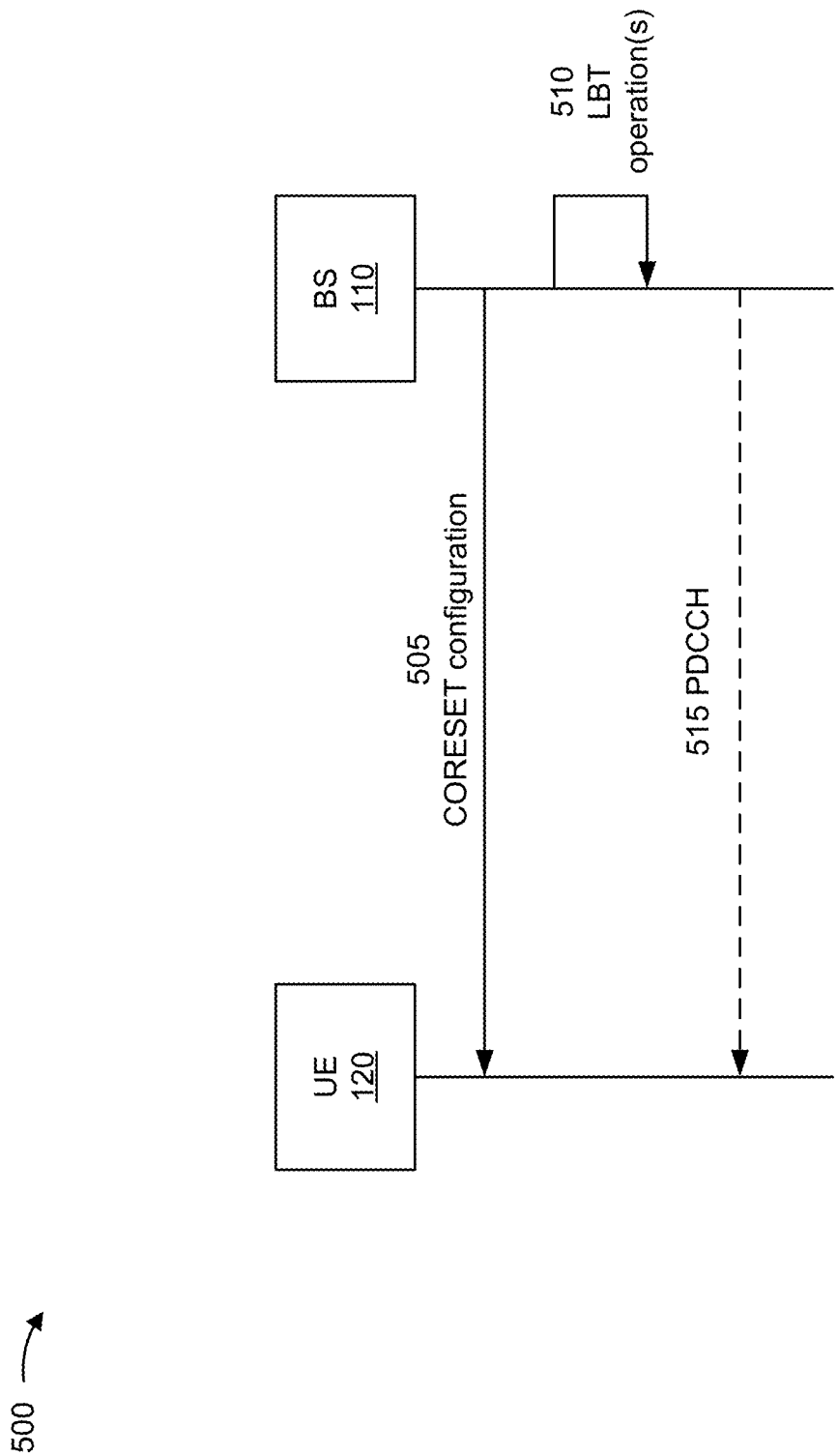

FIG. 5 is a diagram illustrating an example 500 of a CORESET for NR-U, in accordance with various aspects of the present disclosure. As shown in FIG. 5, a UE 120 and a BS 110 may communicate in connection with a PDCCH communication. In some aspects, the UE 120 and the BS 110 may be operating in an unlicensed frequency spectrum. For example, the UE 120 and the BS 110 may be operating in NR-U.

As shown by reference number 505, the BS 110 may transmit, and the UE 120 may receive, a CORESET configuration (e.g., via RRC signaling). The CORESET configuration may identify resources (e.g., RBs) that are included in a CORESET for the UE 120. Accordingly, the UE 120 may monitor the CORESET, in accordance with the CORESET configuration, for a PDCCH communication from the BS 110.

In some aspects, frequency domain resources of the CORESET may be in multiple RB sets. The multiple RB sets may be in respective LBT bandwidths (i.e., bandwidths in which an LBT operation is performed by the BS 110 prior to transmitting). For example, a first RB set may be in a first LBT bandwidth, a second RB set may be in a second LBT bandwidth, and so forth. In some aspects, RB sets may be configured without a guard band between the RB sets (e.g., adjacent RB sets may have a guard band setting that is a zero value).

As shown by reference number 510, the BS 110 may perform respective LBT operations for the multiple RB sets that include the frequency domain resources of the CORESET. For example, the BS 110 may perform a first LBT operation for a first RB set, a second LBT operation for a second RB set, and so forth. The BS 110 may use an LBT operation to determine whether frequency domain resources of an RB set (e.g., a channel) are clear for transmission by the BS 110 (e.g., the resources are clear when an energy measurement of the resources satisfies a threshold value). If the BS 110 performs an LBT operation on frequency domain resources of an RB set and the resources are clear, this may be considered a successful LBT operation. If the BS 110 performs an LBT operation on frequency domain resources of an RB set and the resources are not clear, this may be considered an unsuccessful LBT operation.

As shown by reference number 515, the BS 110 may selectively transmit, and the UE 120 may selectively receive, a PDCCH communication in the CORESET based at least in part on whether the respective LBT operations for the multiple resource block sets are successful. In some aspects, when all of the LBT operations are successful, the BS 110 may acquire transmission opportunities in the multiple RB sets, and may transmit the PDCCH communication in the transmission opportunities. In some aspects, when at least one of the LBT operations is unsuccessful, the BS 110 may not transmit the PDCCH communication. In this way, partial transmission of the PDCCH communication may be avoided, thereby improving a performance of the PDCCH communication.

As indicated above, FIG. 5 is provided as an example. Other examples may differ from what is described with respect to FIG. 5.

Figure 6:
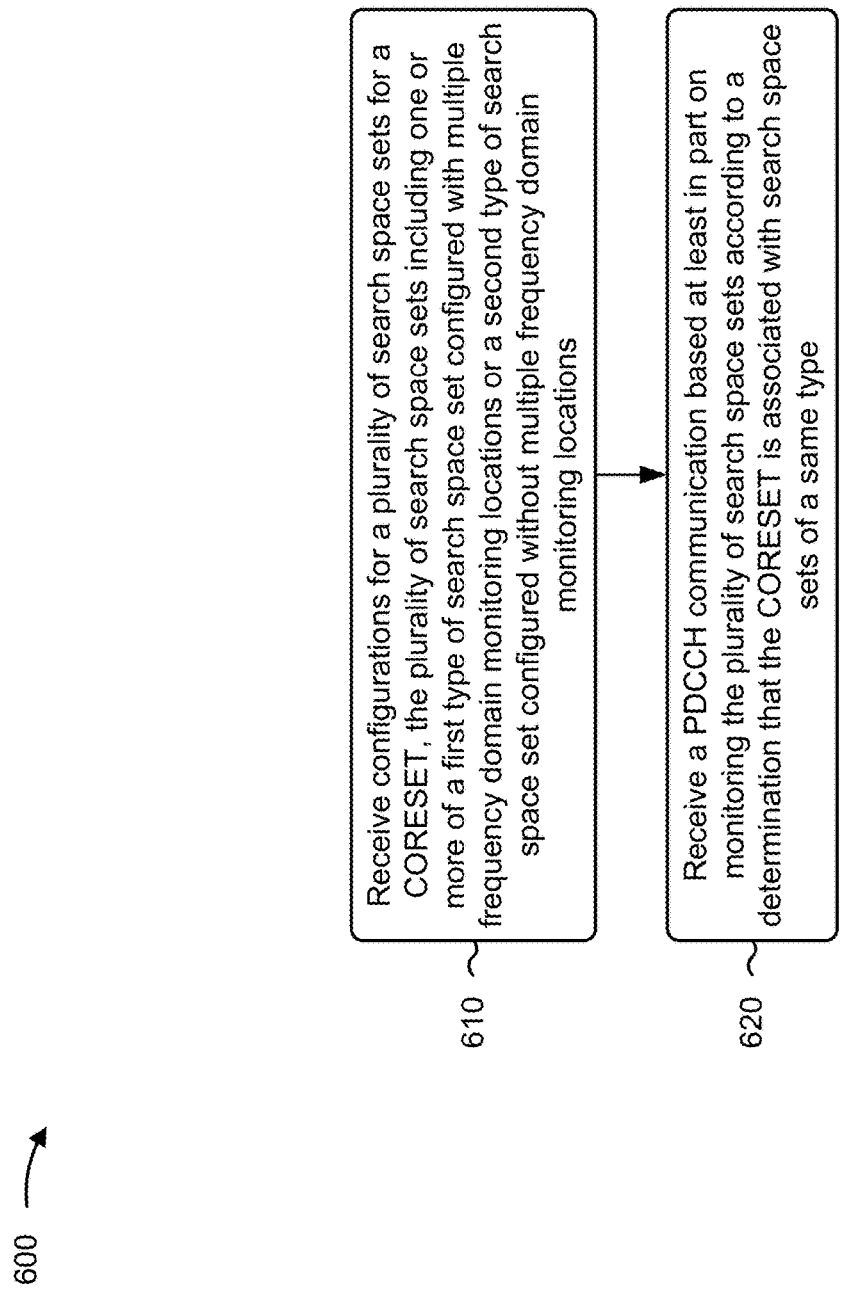
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120, and/or the like) performs operations associated with a CORESET for NR.

As shown in FIG. 6, in some aspects, process 600 may include receiving configurations for a plurality of search space sets for a CORESET, the plurality of search space sets including one or more of a first type of search space set configured with multiple frequency domain monitoring locations or a second type of search space set configured without multiple frequency domain monitoring locations (block 610). For example, the UE (e.g., using controller/processor 280, and/or the like) may receive configurations for a plurality of search space sets for a CORESET, as described above. In some aspects, the plurality of search space sets include one or more of a first type of search space set configured with multiple frequency domain monitoring locations or a second type of search space set configured without multiple frequency domain monitoring locations.

As further shown in FIG. 6, in some aspects, process 600 may include receiving a PDCCH communication based at least in part on monitoring the plurality of search space sets according to a determination that the CORESET is associated with search space sets of a same type (block 620). For example, the UE (e.g., using antenna 252, DEMOD 254, MIMO detector 256, receive processor 258, controller/processor 280, and/or the like) may receive a PDCCH communication based at least in part on monitoring the plurality of search space sets according to a determination that the CORESET is associated with search space sets of a same type, as described above.

Process 600 may include additional aspects, such as any single aspect or any combination of aspects described below and/or in connection with one or more other processes described elsewhere herein.

In a first aspect, the plurality of search space sets for the CORESET are configured without multiple frequency domain monitoring locations.

In a second aspect, one or more of the plurality of search space sets are configured with multiple frequency domain monitoring locations.

In a third aspect, one or more of the plurality of search space sets are configured with multiple frequency domain monitoring locations and one or more of the plurality of search space sets are configured without multiple frequency domain monitoring locations.

In a fourth aspect, alone or in combination with one or more of the first through third aspects, the CORESET is configured with a resource block offset.

In a fifth aspect, alone or in combination with one or more of the first through third aspects, the CORESET is not configured with a resource block offset.

In a sixth aspect, alone or in combination with one or more of the first through fifth aspects, the UE is operating in an unlicensed spectrum.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
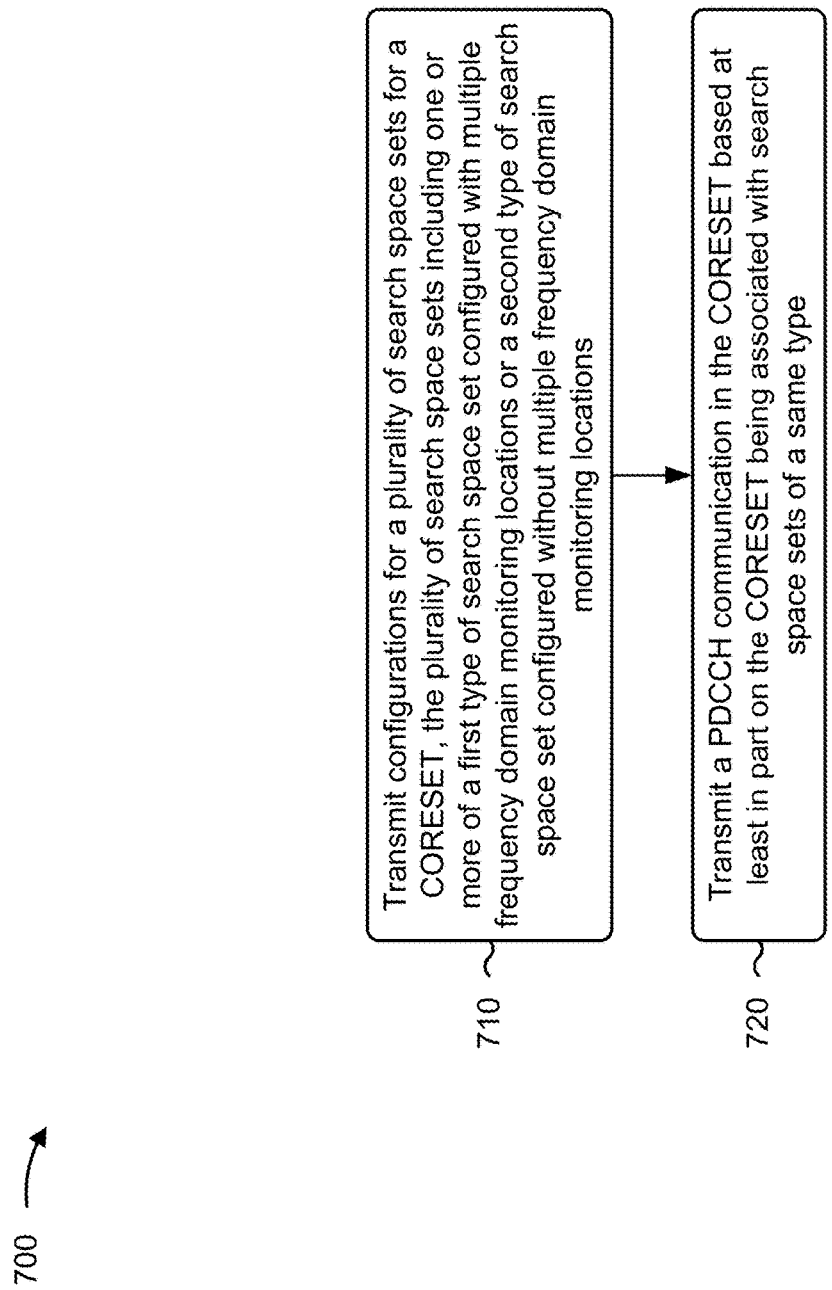
FIG. 7 is a diagram illustrating an example process performed, for example, by a BS, in accordance with various aspects of the present disclosure.

FIG. 7 is a diagram illustrating an example process 700 performed, for example, by a BS, in accordance with various aspects of the present disclosure. Example process 700 is an example where the BS (e.g., BS 110, and/or the like) performs operations associated with a CORESET for NR.

As shown in FIG. 7, in some aspects, process 700 may include transmitting configurations for a plurality of search space sets for a CORESET, the plurality of search space sets including one or more of a first type of search space set configured with multiple frequency domain monitoring locations or a second type of search space set configured without multiple frequency domain monitoring locations (block 710). For example, the BS (e.g., using controller/processor 240, transmit processor 220, TX MIMO processor 230, MOD 232, antenna 234, and/or the like) may transmit configurations for a plurality of search space sets for a CORESET, as described above. In some aspects, the plurality of search space sets include one or more of a first type of search space set configured with multiple frequency domain monitoring locations or a second type of search space set configured without multiple frequency domain monitoring locations.

As further shown in FIG. 7, in some aspects, process 700 may include transmitting a PDCCH communication in the CORESET based at least in part on the CORESET being associated with search space sets of a same type (block 720). For example, the BS (e.g., using controller/processor 240, transmit processor 220, TX MIMO processor 230, MOD 232, antenna 234, and/or the like) may transmit a PDCCH communication in the CORESET based at least in part on the CORESET being associated with search space sets of a same type, as described above.

Process 700 may include additional aspects, such as any single aspect or any combination of aspects described below and/or in connection with one or more other processes described elsewhere herein.

In a first aspect, the plurality of search space sets for the CORESET are configured without multiple frequency domain monitoring locations.

In a second aspect, one or more of the plurality of search space sets are configured with multiple frequency domain monitoring locations.

In a third aspect, one or more of the plurality of search space sets are configured with multiple frequency domain monitoring locations and one or more of the plurality of search space sets are configured without multiple frequency domain monitoring locations.

In a fourth aspect, alone or in combination with one or more of the first through third aspects, the CORESET is configured with a resource block offset.

In a fifth aspect, alone or in combination with one or more of the first through third aspects, the CORESET is not configured with a resource block offset.

In a sixth aspect, alone or in combination with one or more of the first through fifth aspects, the UE is operating in an unlicensed spectrum.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
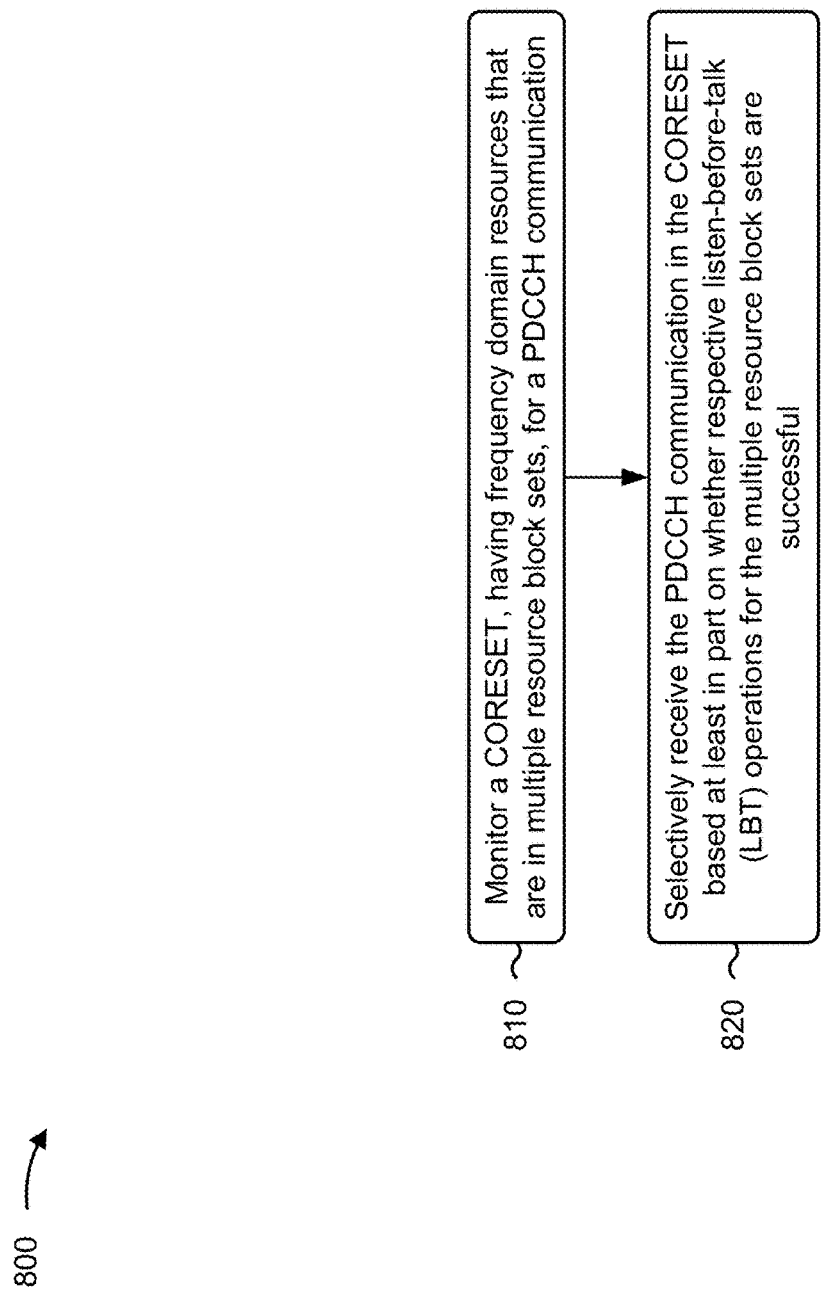
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120, and/or the like) performs operations associated with a CORESET for NR.

As shown in FIG. 8, in some aspects, process 800 may include monitoring a CORESET, having frequency domain resources that are in multiple resource block sets, for a PDCCH communication (block 810). For example, the UE (e.g., using antenna 252, DEMOD 254, MIMO detector 256, receive processor 258, controller/processor 280, and/or the like) may monitor a CORESET, having frequency domain resources that are in multiple resource block sets, for a PDCCH communication, as described above.

As further shown in FIG. 8, in some aspects, process 800 may include selectively receiving the PDCCH communication in the CORESET based at least in part on whether respective LBT operations for the multiple resource block sets are successful (block 820). For example, the UE (e.g., using antenna 252, DEMOD 254, MIMO detector 256, receive processor 258, controller/processor 280, and/or the like) may selectively receive the PDCCH communication in the CORESET based at least in part on whether respective LBT operations for the multiple resource block sets are successful, as described above.

Process 800 may include additional aspects, such as any single aspect or any combination of aspects described below and/or in connection with one or more other processes described elsewhere herein.

In a first aspect, the UE is operating in an unlicensed spectrum. In a second aspect, alone or in combination with the first aspect, the multiple resource block sets are in respective LBT bandwidths.

In a third aspect, alone or in combination with one or more of the first and second aspects, the PDCCH communication is received when all of the LBT operations are successful. In a fourth aspect, alone or in combination with one or more of the first through third aspects, the PDCCH communication is not received when at least one of the LBT operations is unsuccessful.

In a fifth aspect, alone or in combination with one or more of the first through fourth aspects, the multiple resource block sets are configured without a guard band between resource block sets.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
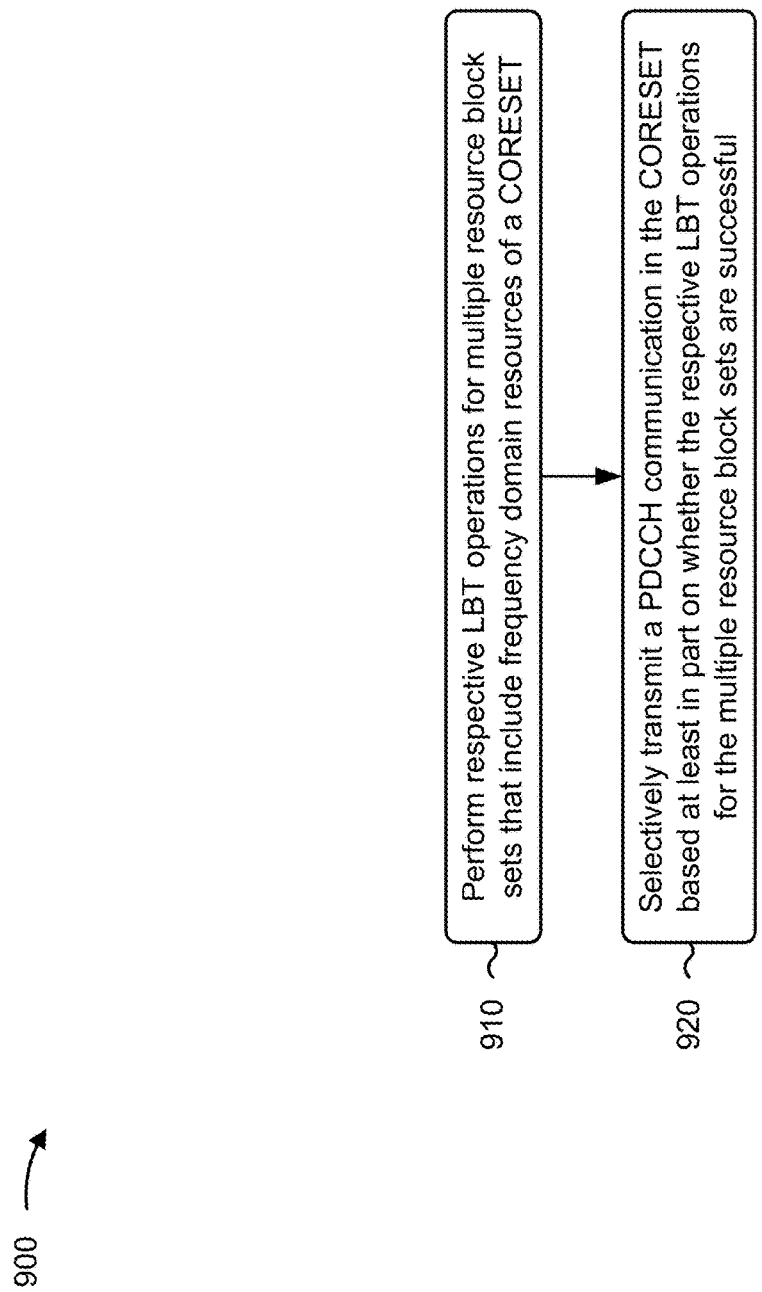
FIG. 9 is a diagram illustrating an example process performed, for example, by a BS, in accordance with various aspects of the present disclosure.

FIG. 9 is a diagram illustrating an example process 900 performed, for example, by a BS, in accordance with various aspects of the present disclosure. Example process 900 is an example where the BS (e.g., BS 110, and/or the like) performs operations associated with a CORESET for NR.

As shown in FIG. 9, in some aspects, process 900 may include performing respective LBT operations for multiple resource block sets that include frequency domain resources of a CORESET (block 910). For example, the BS (e.g., using controller/processor 240, and/or the like) may perform respective LBT operations for multiple resource block sets that include frequency domain resources of a CORESET, as described above.

As further shown in FIG. 9, in some aspects, process 900 may include selectively transmitting a PDCCH communication in the CORESET based at least in part on whether the respective LBT operations for the multiple resource block sets are successful (block 920). For example, the BS (e.g., using controller/processor 240, transmit processor 220, TX MIMO processor 230, MOD 232, antenna 234, and/or the like) may selectively transmit a PDCCH communication in the CORESET based at least in part on whether the respective LBT operations for the multiple resource block sets are successful, as described above.

Process 900 may include additional aspects, such as any single aspect or any combination of aspects described below and/or in connection with one or more other processes described elsewhere herein.

In a first aspect, the BS is operating in an unlicensed spectrum. In a second aspect, alone or in combination with the first aspect, the multiple resource block sets are in respective LBT bandwidths.

In a third aspect, alone or in combination with one or more of the first and second aspects, the PDCCH communication is transmitted when all of the LBT operations are successful. In a fourth aspect, alone or in combination with one or more of the first through third aspects, the PDCCH communication is not transmitted when at least one of the LBT operations is unsuccessful.

In a fifth aspect, alone or in combination with one or more of the first through fourth aspects, the multiple resource block sets are configured without a guard band between resource block sets.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some aspects of the present disclosure:

Aspect 1: A method of wireless communication performed by a user equipment (UE), comprising: receiving configurations for a plurality of search space sets for a control resource set (CORESET), the plurality of search space sets including one or more of a first type of search space set configured with multiple frequency domain monitoring locations or a second type of search space set configured without multiple frequency domain monitoring locations; and receiving a physical downlink control channel (PDCCH) communication based at least in part on monitoring the plurality of search space sets according to a determination that the CORESET is associated with search space sets of a same type.

Aspect 2: The method of aspect 1, wherein the plurality of search space sets for the CORESET are configured without multiple frequency domain monitoring locations.

Aspect 3: The method of aspect 1, wherein one or more of the plurality of search space sets are configured with multiple frequency domain monitoring locations.

Aspect 4: The method of aspect 1, wherein one or more of the plurality of search space sets are configured with multiple frequency domain monitoring locations and one or more of the plurality of search space sets are configured without multiple frequency domain monitoring locations.

Aspect 5: The method of any of aspects 1-4, wherein the CORESET is configured with a resource block offset.

Aspect 6: The method of any of aspects 1-4, wherein the CORESET is not configured with a resource block offset.

Aspect 7: The method of any of aspects 1-6, wherein the UE is operating in an unlicensed spectrum.

Aspect 8: A method of wireless communication performed by a base station (BS), comprising: transmitting configurations for a plurality of search space sets for a control resource set (CORESET), the plurality of search space sets including one or more of a first type of search space set configured with multiple frequency domain monitoring locations or a second type of search space set configured without multiple frequency domain monitoring locations; and transmitting a physical downlink control channel (PDCCH) communication in the CORESET based at least in part on the CORESET being associated with search space sets of a same type.

Aspect 9: The method of aspect 8, wherein the plurality of search space sets for the CORESET are configured without multiple frequency domain monitoring locations.

Aspect 10: The method of aspect 8, wherein one or more of the plurality of search space sets are configured with multiple frequency domain monitoring locations.

Aspect 11: The method of aspect 8, wherein one or more of the plurality of search space sets are configured with multiple frequency domain monitoring locations and one or more of the plurality of search space sets are configured without multiple frequency domain monitoring locations.

Aspect 12: The method of any of aspects 8-11, wherein the CORESET is configured with a resource block offset.

Aspect 13: The method of any of aspects 8-11, wherein the CORESET is not configured with a resource block offset.

Aspect 14: The method of any of aspects 8-13, wherein the BS is operating in an unlicensed spectrum.

Aspect 15: A method of wireless communication performed by a user equipment (UE), comprising: monitoring a control resource set (CORESET), having frequency domain resources that are in multiple resource block sets, for a physical downlink control channel (PDCCH) communication; and selectively receiving the PDCCH communication in the CORESET based at least in part on whether respective listen-before-talk (LBT) operations for the multiple resource block sets are successful.

Aspect 16: The method of aspect 15, wherein the UE is operating in an unlicensed spectrum.

Aspect 17: The method of any of aspects 15-16, wherein the multiple resource block sets are in respective LBT bandwidths.

Aspect 18: The method of any of aspects 15-17, wherein the PDCCH communication is received when all of the LBT operations are successful.

Aspect 19: The method of aspects 15-17, wherein the PDCCH communication is not received when at least one of the LBT operations is unsuccessful.

Aspect 20: The method of any of aspects 15-19, wherein the multiple resource block sets are configured without a guard band between resource block sets.

Aspect 21: A method of wireless communication performed by a base station (BS), comprising: performing respective listen-before-talk (LBT) operations for multiple resource block sets that include frequency domain resources of a control resource set (CORESET); and selectively transmitting a physical downlink control channel (PDCCH) communication in the CORESET based at least in part on whether the respective LBT operations for the multiple resource block sets are successful.

Aspect 22: The method of aspect 21, wherein the BS is operating in an unlicensed spectrum.

Aspect 23: The method of any of aspects 21-22, wherein the multiple resource block sets are in respective LBT bandwidths.

Aspect 24: The method of any of aspects 21-23, wherein the PDCCH communication is transmitted when all of the LBT operations are successful.

Aspect 25: The method of any of aspects 21-23, wherein the PDCCH communication is not transmitted when at least one of the LBT operations is unsuccessful.

Aspect 26: The method of any of aspects 21-25, wherein the multiple resource block sets are configured without a guard band between resource block sets.

Aspect 27: An apparatus for wireless communication at a device, comprising a processor; memory coupled with the processor; and instructions stored in the memory and executable by the processor to cause the apparatus to perform the method of one or more aspects of aspects 1-7.

Aspect 28: A device for wireless communication, comprising a memory and one or more processors coupled to the memory, the memory and the one or more processors configured to perform the method of one or more aspects of aspects 1-7.

Aspect 29: An apparatus for wireless communication, comprising at least one means for performing the method of one or more aspects of aspects 1-7.

Aspect 30: A non-transitory computer-readable medium storing code for wireless communication, the code comprising instructions executable by a processor to perform the method of one or more aspects of aspects 1-7.

Aspect 31: A non-transitory computer-readable medium storing a set of instructions for wireless communication, the set of instructions comprising one or more instructions that, when executed by one or more processors of a device, cause the device to perform the method of one or more aspects of aspects 1-7.

Aspect 32: An apparatus for wireless communication at a device, comprising a processor; memory coupled with the processor; and instructions stored in the memory and executable by the processor to cause the apparatus to perform the method of one or more aspects of aspects 8-14.

Aspect 33: A device for wireless communication, comprising a memory and one or more processors coupled to the memory, the memory and the one or more processors configured to perform the method of one or more aspects of aspects 8-14.

Aspect 34: An apparatus for wireless communication, comprising at least one means for performing the method of one or more aspects of aspects 8-14.

Aspect 35: A non-transitory computer-readable medium storing code for wireless communication, the code comprising instructions executable by a processor to perform the method of one or more aspects of aspects 8-14.

Aspect 36: A non-transitory computer-readable medium storing a set of instructions for wireless communication, the set of instructions comprising one or more instructions that, when executed by one or more processors of a device, cause the device to perform the method of one or more aspects of aspects 8-14.

Aspect 37: An apparatus for wireless communication at a device, comprising a processor; memory coupled with the processor; and instructions stored in the memory and executable by the processor to cause the apparatus to perform the method of one or more aspects of aspects 15-20.

Aspect 38: A device for wireless communication, comprising a memory and one or more processors coupled to the memory, the memory and the one or more processors configured to perform the method of one or more aspects of aspects 15-20.

Aspect 39: An apparatus for wireless communication, comprising at least one means for performing the method of one or more aspects of aspects 15-20.

Aspect 40: A non-transitory computer-readable medium storing code for wireless communication, the code comprising instructions executable by a processor to perform the method of one or more aspects of aspects 15-20.

Aspect 41: A non-transitory computer-readable medium storing a set of instructions for wireless communication, the set of instructions comprising one or more instructions that, when executed by one or more processors of a device, cause the device to perform the method of one or more aspects of aspects 15-20.

Aspect 42: An apparatus for wireless communication at a device, comprising a processor; memory coupled with the processor; and instructions stored in the memory and executable by the processor to cause the apparatus to perform the method of one or more aspects of aspects 21-26.

Aspect 43: A device for wireless communication, comprising a memory and one or more processors coupled to the memory, the memory and the one or more processors configured to perform the method of one or more aspects of aspects 21-26.

Aspect 44: An apparatus for wireless communication, comprising at least one means for performing the method of one or more aspects of aspects 21-26.

Aspect 45: A non-transitory computer-readable medium storing code for wireless communication, the code comprising instructions executable by a processor to perform the method of one or more aspects of aspects 21-26.

Aspect 46: A non-transitory computer-readable medium storing a set of instructions for wireless communication, the set of instructions comprising one or more instructions that, when executed by one or more processors of a device, cause the device to perform the method of one or more aspects of aspects 21-26.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
one or more memories; and
one or more processors coupled to the one or more memories, the one or more processors configured to:
receive configurations for a plurality of search space sets for a control resource set (CORESET), wherein the plurality of search space sets include: a plurality of first search space sets of a first type configured with a frequency domain monitoring locations parameter, or a plurality of second search space sets of a second type configured without the frequency domain monitoring locations parameter, and wherein the frequency domain monitoring locations parameter configures multiple frequency domain monitoring locations; and
receive a physical downlink control channel (PDCCH) communication based at least in part on monitoring the plurality of search space sets according to a determination that the CORESET is associated with search space sets of a same type, wherein the determination that the CORESET is associated with search space sets of a same type includes a determination that at least one of the plurality of search space sets is configured with the frequency domain monitoring locations parameter, and wherein the plurality of search space sets include the plurality of search space sets of the first type.

2. The UE of claim 1,
wherein each of the plurality of first search space sets are configured with the frequency domain monitoring locations parameter.

3. The UE of claim 1,
wherein each of the plurality of second search space sets are configured without the frequency domain monitoring locations parameter.

4. The UE of claim 1,
wherein the CORESET is in a bandwidth part and comprises a plurality of resource block sets that are in the bandwidth part, and wherein each of the multiple frequency domain monitoring locations corresponds to one of the plurality of resource block sets.

5. The UE of claim 1,
wherein the CORESET is configured with a resource block offset.

6. The UE of claim 1,
wherein the UE is operating in an unlicensed spectrum.

7. The UE of claim 1, wherein the UE refrains from receiving the PDCCH communication when none of the plurality of search space sets is configured with the frequency domain monitoring locations parameter.

8. A method of wireless communication performed by a user equipment (UE), comprising:
receiving configurations for a plurality of search space sets for a control resource set (CORESET), wherein the plurality of search space sets include: a plurality of first search space sets of a first type configured with a frequency domain monitoring locations parameter, or a plurality of second search space sets of a second type configured without the frequency domain monitoring locations parameter, and wherein the frequency domain monitoring locations parameter configures multiple frequency domain monitoring locations; and
receiving a physical downlink control channel (PDCCH) communication based at least in part on monitoring the plurality of search space sets according to a determination that the CORESET is associated with search space sets of a same type, wherein the determination that the CORESET is associated with search space sets of a same type includes a determination that at least one of the plurality of search space sets is configured with the frequency domain monitoring locations parameter, and wherein the plurality of search space sets include the plurality of search space sets of the first type.

9. The method of claim 8,
wherein each of the plurality of first search space sets are configured with multiple frequency domain monitoring locations.

10. The method of claim 8,
wherein each of the plurality of second search space sets are configured without multiple frequency domain monitoring locations.

11. The method of claim 8,
wherein the CORESET is in a bandwidth part and comprises a plurality of resource block sets that are in the bandwidth part, and wherein each of the multiple frequency domain monitoring locations corresponds to one of the plurality of resource block sets.

12. The method of claim 8,
wherein the CORESET is configured with a resource block offset.

13. The method of claim 8,
wherein the CORESET is not configured with a resource block offset.

14. The method of claim 8,
wherein the UE is operating in an unlicensed spectrum.

15. The method of claim 8, wherein the UE refrains from receiving the PDCCH communication when none of the plurality of search space sets is configured with the frequency domain monitoring locations parameter.

16. A non-transitory computer-readable medium storing a set of instructions for wireless communication, the set of instructions comprising:
one or more instructions that, when executed by one or more processors of a user equipment (UE), cause the UE to:
receive configurations for a plurality of search space sets for a control resource set (CORESET), wherein the plurality of search space sets include: a plurality of first search space sets of a first type configured with a frequency domain monitoring locations parameter, or a plurality of second search space sets of a second type configured without the frequency domain monitoring locations parameter, and wherein the frequency domain monitoring locations parameter configures multiple frequency domain monitoring locations; and
receive a physical downlink control channel (PDCCH) communication based at least in part on monitoring the plurality of search space sets according to a determination that the CORESET is associated with search space sets of a same type, wherein the determination that the CORESET is associated with search space sets of a same type includes a determination that at least one of the plurality of search space sets is configured with the frequency domain monitoring locations parameter, and wherein the plurality of search space sets include the plurality of search space sets of the first type.

17. The non-transitory computer-readable medium of claim 16, wherein each of the plurality of first search space sets are configured with the frequency domain monitoring locations parameter.

18. The non-transitory computer-readable medium of claim 16, wherein each of the plurality of second search space sets are configured without the frequency domain monitoring locations parameter.

19. The non-transitory computer-readable medium of claim 16, wherein the CORESET is configured with a resource block offset.

20. The non-transitory computer-readable medium of claim 16, wherein the UE refrains from receiving the PDCCH communication when none of the plurality of search space sets is configured with the frequency domain monitoring locations parameter.

\* \* \* \* \*